United States Patent [19]

Starkweather, Jr.

[11] 3,963,799

[45] June 15, 1976

[54] GRAFT COPOLYMER IN POLYAMIDE POLYETHYLENE BLENDS

[75] Inventor: Howard Warner Starkweather, Jr., Wilmington, Del.

[73] Assignee: E. I. Du Pont de Nemours and Company, Wilmington, Del.

[22] Filed: Nov. 13, 1974

[21] Appl. No.: 523,467

[52] U.S. Cl. .......................... 260/857 L; 260/857 G
[51] Int. Cl.$^2$ .................. C08L 77/02; C08L 77/06
[58] Field of Search .................... 260/857 G, 857 L

[56] References Cited
UNITED STATES PATENTS

| | | | |
|---|---|---|---|
| 2,524,045 | 10/1950 | Flory | 260/857 G |
| 3,136,738 | 6/1964 | Hedrick | 260/857 G |
| 3,325,561 | 6/1967 | Grillo | 260/857 G |
| 3,388,186 | 6/1968 | Kray | 260/857 G |
| 3,465,059 | 9/1969 | Seven | 260/857 L |
| 3,676,400 | 7/1972 | Kohan | 260/857 L |

Primary Examiner—Allan Lieberman

[57] ABSTRACT

Polymeric blend of 60 to 90 parts by weight of a polyamide, e.g., polyhexamethylene adipamide or polycaprolactam, and 40 to 10 parts by weight of polyethylene or crystalline copolymer of ethylene, e.g., ethylene and methacrylic acid, characterized in that there is present in the blend 1.8 to 8.0 parts by weight of a thermoplastic graft copolymer consisting essentially of a trunk copolymer derived from ethylene and a comonomer providing amine-reactive sites and polycaprolactam side chains linked to said reactive sites through amide or imide linkages. The modified blends are useful as injection molding resins, for wire jacketing, etc.

15 Claims, No Drawings

GRAFT COPOLYMER IN POLYAMIDE POLYETHYLENE BLENDS

BACKGROUND OF THE INVENTION

1. Field of the Invention

This invention relates to blends of polyamides and polyolefins and particularly to blends of polyamides and polyolefins containing a minor portion of graft copolymer.

2. Description of the Prior Art

Blends of polyamides and polyolefins such as polyethylene are known. U.S. Pat. No. 3,093,255 describes a process for preparing a blend wherein each component is present in the amount of at least 5 percent by weight. The blends are disclosed as being useful as containers, e.g., bottle or wrapping film, and fibers. Blends of modified polyethylene and a polyamide are known to make hot melt coatings and transparent packaging materials as taught in U.S. Pat. No. 3,484,403. The blends are said to be incompatible in the melt state but compatible as the melt cools and passes into the solid state. U.S. Pat. No. 3,626,026 describes another blend of an ethylene copolymer and a polyamide used as hot melt adhesive compositions. The ethylene copolymer contains vinyl acetate or ethyl acrylate. The ethylene copolymer is present in 50 to 95 parts by weight and the polyamide in 5 to 50 parts by weight. In one embodiment, improved properties are achieved by the addition of conditioning agents, e.g., low molecular weight polyethylenes, turpentine resins, etc. None of the references describes the use of a minor amount of graft copolymer in the blend which materially aids in permitting the fine grain dispersion of a polyethylene component in a polyamide.

SUMMARY OF THE INVENTION

According to the invention, there is provided a polymeric blend comprising 60 to 90 parts by weight of a polyamide selected from the group consisting of polyhexamethylene adipamide, polycaprolactam or copolymers thereof and 40 to 10 parts by weight of a polymer selected from the group consisting of polyethylene or a crystalline copolymer of ethylene, characterized in that there is present in the blend 1.8 to 8.0 parts by weight of a thermoplastic graft copolymer consisting essentially of a trunk copolymer derived from ethylene and a comonomer providing amine-reactive sites, and polycaprolactam said chains linked to said reactive sites through amide or imide linkages, said graft copolymer having two DTA melting points, one at 80° to 115°C. and the other at at least 165°C.

DETAILED DESCRIPTION OF THE INVENTION

The polymer blend comprises three primary components:

1. a polyamide taken from the group consisting of polyhexamethylene adipamide and polycaprolactam or copolymers thereof, 60 to 90 parts by weight, preferably 70 to 80 parts by weight;

2. a polymer selected from the group consisting of polyethylene or a crystalline copolymer of ethylene, 40 to 10 parts by weight, preferably 30 to 20 parts by weight; and 3. a thermoplastic graft copolymer, as defined above, 1.8 to 8.0 parts by weight.

The graft copolymers are believed to reduce the interfacial free energy of the blend of polyamide and polyethylene or crystalline copolymer of ethylene, thus permitting a uniform fine grain dispersion of polyethylene in the polyamide. While not desiring to be limited to any theory, it is believed that the graft copolymers defined herein not only reduce the interfacial free energy but anchor themselves in both phases through cocrystallization and thus function as an adhesive. This is important because in a solid, unlike a liquid emulsion, an interface once broken cannot be reformed without melting.

The polyamide used in the blend is either polyhexamethylene adipamide or polycaprolactam which are commercially available. For example, Zytel 101, a nylon (66) resin sold by E. I. du Pont de Nemours and Company, Inc. or Plaskon 8200, a nylon (6) resin sold by Allied Chemical Corp. are useful as are reprocessed polyamide textile fibers. Copolymers of the polyamides can be used.

The polyethylene or crystalline copolymer of ethylene used in the blend can be high density polyethylene, low density polyethylene or a crystallizable copolymer of ethylene with other monomers, e.g., methacrylic acid, methyl methacrylate, vinyl acetate, methyl acrylate, etc. The amount and type of other monomer are limited only in that crystallinity of the ethylene copolymer is not destroyed. The polyethylenes are generally commercially available; one useful polyethylene is Alathon 7050 (density 0.95, melt index 6) a polyethylene resin sold by E. I. du Pont de Nemours and Company, Inc. Other useful commercial polyethylenes include: Alathon 3B (density 0.915, melt index 0.25) low density polyethylene sold by E. I. du Pont de Nemours and Company, Inc. and a copolymer of ethylene and methacrylic acid sold as PE-3938-2 (melt index 5.8, 4% by weight methacrylic acid) sold by E. I. du Pont de Nemours and Company, Inc.

Surprisingly, it has been found that a blend having improved properties is achieved when a minor amount, 1.8 to 8.0 parts by weight, preferably 2 to 5 parts by weight, of a particular type thermoplastic graft copolymer as defined herein is present in the blend. The graft copolymer consists essentially of a trunk copolymer derived from ethylene and a comonomer providing amine-reactive sites and polycaprolactam side chains linked to the reactive sites through amide or imide linkages, the graft copolymer having two DTA melting points, one at 80° to 115°C. and the other at at least 165°C., preferably 175° to 200°C. The graft copolymers are more fully described below.

The graft copolymers can be prepared in various ways. The convenient ways described herein can be identified as (1) the acid chloride route, for use with backbone copolymers having free carboxylic acid groups, (2) the anhydride route, for use with ethylene/maleic anhydride and other anhydride-containing backbone copolymers, and (3) the vicinal acid-ester route, for use with backbone copolymers having monoester of vicinal dicarboxylic acid substituents.

The acid chloride route involves initial conversion of the carboxyl groups of the backbone copolymer to acid chloride groups by reaction with thionyl chloride, the reaction being conducted in solution with a solvent such as toluene or tetrachloroethylene. The solution of polymeric polyacid chloride is agitated at 75°–105°C. for 30 to 60 minutes with a solution of the amine-ended polycaprolactam dissolved in an inert solvent such as hexamethylphosphoramide to create, in a conventional manner, amide

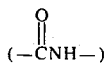

linkages between the trunk copolymer and the side chain polyamides. An acid acceptor such as triethylamine or pyridine is usually used in the amide-forming stage. The ratio of acid chloride groups to amino end groups can be varied, with the amino groups being in no more than stoichiometric amounts in relation to the acid chloride groups. When less than the stoichiometric amount of polycaprolactam is used, it is desirable to add a low molecular weight amine (e.g., n-hexylamine) or alcohol (e.g., methanol) to react with the excess acid chloride groups in order to avoid having residual reactive or corrosive acid chloride groups in the graft copolymer. With relatively large deficiencies in the polycaprolactam reactant, it is desirable to add any additional monomeric amine along with the oligomer during the grafting reaction. With small deficiencies of polycaprolactam any additional amine may be employed after the grafting reaction with the polycaprolactam has been substantially completed.

The anhydride route which is preferred involves simply heating together the trunk copolymer with carboxylic anhydride groups, preferably maleic anhydride, and the polycaprolactam in the molten state, at a temperature in the range 175° to 250°C., preferably at about 225°C., or in a solution at a temperature of about 100°C. to 105°C. In the melt the heating temperature is above the melting point of the trunk copolymer and the polycaprolactam. The time of reaction, which is dependent upon the temperature, can vary from less than about 15 seconds to 60 minutes in the melt, preferably 1 to 10 minutes, and from 15 seconds to 5 hours in solution, preferably 1 to 10 minutes. Reaction in the melt, an especially preferred procedure, can conveniently be carried out on a roll mill, in a melt extruder, or in internal mixers having convoluted rollers, sigma blades, etc., using a temperature that will give short reaction time and as many passes as necessary to insure complete reaction. The reaction time may be limited by the speed of mixing. Completeness of reaction can be judged by the appearance of the product, good clarity in the melt indicating essentially complete reaction. With a roll mill as the reactor, the trunk copolymer and polycaprolatam can be premixed or mixed during reaction on the mill, and because of the exposure it may be desirable to include stabilizing agents such as inhibitors or antioxidants, or to carry out the operation in a protective atmosphere such as nitrogen. With an extruder as the reactor, premixing is desirable. On the basis of IR analysis of the products, an interpretation of the course of the thermal reaction is that it may proceed through initial formation of amic acids to ultimate formation of amide or imide linkages between the backbone copolymer and the polyamide side chains, e.g.:

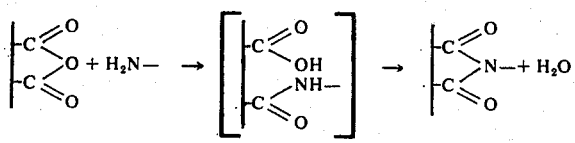

The amount of amino polycaprolactam used can vary from a stoichiometrical deficiency to an equivalent amount, depending upon the extent of side chain substitution desired on the graft copolymer.

The vicinal acid-ester route has in general the operating characteristics of the anhydride route, i.e., it can be carried out in solution or in the melt for reaction times similar to those for the anhydride route described above. Graft copolymer is believed to be obtained by attachment of the polycaprolactam side chain to the trunk copolymer through imide linkages (with elimination of alcohol and water) which may be derived through intermediate formation of amic acids, e.g.,

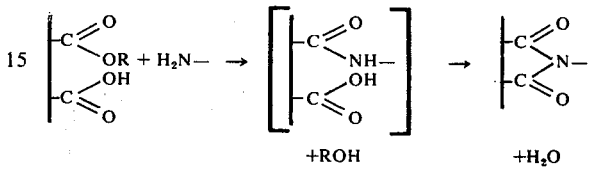

or by prior conversion of the vicinal acid-ester by loss of alcohol to an anhydride and reaction of the latter with the polycaprolactam as described above. The description above of the anhydride route as carried out on a roll mill or in an extruder applies as well to the vicinal acid-ester route conducted in the same way.

The reaction of the amine group with the anhydride is fast, so that the effective reaction rate of polymers containing these groups may be limited by other factors such as the rate of mixing. When two polymers are dissolved in solution, separately, and the two solutions poured together, rapid intimate mixing is obtained.

The graft copolymers have a trunk copolymer of ethylene and a comonomer providing amine-reactive sites for attaching the side chain polymers thereto. The amine-reactive sites are provided by a comonomer selected from the group consisting of an anhydride group, a vicinal pair of carboxylic groups and a carboxylic group adjacent to alkoxycarbonyl group, wherein the alkoxy group contains up to 20 carbon atoms, preferably 1 to 4 carbon atoms. Preferably the amine-reactive sites are provided by a comonomer selected from the group consisting of maleic anhydride, half ester of maleic acid, and the half ester of itaconic acid. The comonomer is reacted with the ethylene. Suitable trunk copolymers include the reaction product of ethylene with one or more of the following monomers: maleic anhydride, (lower mono-alkyl $C_1$ to $C_4$) maleate, (lower monoalkyl $C_1$ to $C_4$) itaconate, (lower monoalkyl $C_1$ to $C_4$) fumarate. The preferred trunk copolymer is the reaction product of ethylene and maleic anhydride or ethyl hydrogen maleate.

The trunk copolymers can be prepared by known vinyl polymerization techniques. The ethylene and comonomers are randomly interconnected through C—C linkages and contain 70–99, preferably 85 to 99, percent by weight of ethylene. The trunk copolymers have a melt index in the range of 5 to 200, preferably 100 to 200. The crystalline melting point of the trunk copolymer is above normal ambient temperature, e.g., about 100°C.

The side chain polymers are linked to the reactive sites on the trunk copolymer through amide or imide linkages and are polymers of caprolactam. The side chains are limited in length having an average degree of polymerization of 5 to 30, preferably 6 to 10, and more preferably 6 to 8. The polycaprolactam side chains are terminated with one primary amine end group and the other ends or groups are substantially unreactive with the reactive sites of the trunk copolymer. These non-reactive end groups include N-alkyl amide wherein alkyl is in the range of 1 to 20, preferably 4-6, carbon atoms, carboxylic acid, etc. Based on the weight of the graft copolymer, 15 to 50 preferably 15 to 35, percent by weight of the graft copolymer is from the caprolactam side chains.

The graft copolymers as described herein are plastic in nature rather than elastomeric. To distinguish the plastic graft copolymers from elastomeric graft copolymers several properties have been selected, e.g., differential thermal analysis (DTA), flexural modulus, cold draw, etc. The plastic graft copolymers are prepared from a crystalline trunk copolymer and polycaprolactam and have two DTA melting points, one at 80° to 115°C. and the other at at least 165°C., preferably 175° to 200°C. The elastomeric graft copolymers exhibit only one DTA melting point, the higher temperature stated above. Flexural modulus is another property, whereby the graft copolymers can be differentiated. The flexural modulus is affected not only by the difference in components and the amount of each component present, but the length of the side chain polymers. Below a flexural modulus of 28,000 p.s.i. at room temperature the graft copolymers are elastomeric. The flexural modulus dividing point is not sharply drawn particularly when the polyamide content approaches 50 percent by weight. At lower concentrations of polyamide, however, e.g., 25 percent or less, the flexural modulus of the elastomeric graft copolymers is well below 28,000 p.s.i. The trunk copolymer of the plastic graft copolymers described herein when cold drawn at temperatures below their crystalline melting points and held for one minute before release become oriented and do not appreciably recover from the deformation within a 1 minute period. The elastomeric trunk copolymers when crosslinked retract within one minute to less than 1.5 times their original lengths after being stretched at 18°-29°C. to twice their lengths and held for 1 minute before release.

The graft copolymers are identified as such, rather than as mere mixtures or blends of polyamides with predominantly hydrocarbon ethylenic polymers, by their clarity in the melt, by their solubility properties, and by their retention of physical properties, e.g., tensile strength, modulus, etc., at elevated temperatures. Blended mixtures of the carboxylic backbone copolymers and the polycaprolactam are characteristically cloudy in the melt prior to completion of the grafting reaction. The mixtures, in contrast to the graft copolymers, can be separated by extraction with suitable solvents.

Knowing the degree of polymerization (DP) of each starting polymer side chain, it is possible to plot DP versus the peak melting point of each resulting graft copolymer, as determined with a differential scanning calorimeter (DSC). It has been observed that the peak melting point increases as the DP of the side chains increases. Such a plot can serve as a calibration curve which can be used for the determination of the DP of the grafts in the copolymers of the present invention.

The graft copolymers must be conditioned for testing by first heating to 250°C., then cooling at the rate of 10°C. per minute to 50°C. During the test, the sample is heated at the rate of 10°C. per minute.

DSC techniques are discussed in *Thermoanalytical Methods of Investigation*, by P. D. Garn, Academic Press, New York, 1965.

A convenient and somewhat related technique for correlating the DP of the grafted polymer side chain with its melting point is differential thermal analysis (DTA). The sample also must be preconditioned and is heated during the test at the rate of 20°C. per minute. The details of the DTA technique are described in *Differential Thermal Analysis*, R. C. MacKenzie, Editor, Academic Press, New York, 1970; especially in Chapter 23, by C. B. Murphy, dealing with polymers, Vol. I, pp. 643-671.

A preferred polymeric blend comprises 75 parts by weight of polyamide, 25 parts by weight polyethylene, and 2 parts by weight of graft copolymer having polycaprolactam branches with a degree of polymerization of about 7.

It has been found that by the presence of a small amount of the graft copolymer in a blend of polyamide and polyethylene the uniformity of blend as well as its toughness and elongation in the dry state are improved. The compatibility of the components of the blend is excellent. The polyolefin segments between the side chains in the graft copolymer are believed to enter the polyethylene phase and return to the interface therefore they should be longer than the side chains.

The blends are useful as jacketing over insulated wire and for making various parts and components.

EXAMPLES OF THE INVENTION

The following examples wherein the parts are by weight unless indicated illustrate the invention. The degree of polymerization (DP) of the amine-terminated oligomer side chain is determined by end group analysis. The amine end groups are determined by titration with a strong acid, either in the presence of an indicator or by a potentiometric or a conductometric method. Acid end groups are determined by titration with a strong base. These techniques are discussed in *Nylon Plastics*, M. I. Kohan, Editor, pp. 38 and 105, John Wiley and Sons, New York (1973), and in *Encyclopedia of Polymer Science And Technology*, Vol. 10, pp. 542 and 543, John Wiley and Sons, New York (1969). Flexural modulus is measured by standard ASTM D-790-71. Samples are injection molded using a cylinder temperature of 280°C. and a mold temperature of 50°C. to form bars 5 × 0.5 × 0.125 inches. The bars are conditioned at room temperature 16-24 hours before testing. The test is conducted using a 2 inch span at a crosshead speed of 0.05 inch/min. The tangent modulus of elasticity (flexural modulus) is calculated using the equation given in the ASTM procedure. The value obtained is expressed in flex modulus in lb./sq. in. Percent elongation at break (Elongation), tensile strength at yield in p.s.i. (Yield Point) and ultimate tensile strength in p.s.i. (Ultimate Strength) are measured by the standard ASTM D-638-72 test. The Izod Impact Strength test (Izod) was determined by standard ASTM-D-256-73 on injection molded bars with machined notches. Samples are allowed to condition at room temperature for 16-24 hours, after cutting and notching, before testing. Five bars of each sample are tested and the average value reported as the Izod Impact Strength in ft. lbs./inch of notch. The diameter of polyethylene particles was determined by scanning electron microscopy.

EXAMPLES 1 TO 16

Pellets of polyamide (nylon), an ethylene polymer and a graft copolymer having an ethylene copolymer backbone and caprolactam side chains were mixed and fed to a twin screw extruder for melt blending. The resulting compositions were injection molded at 285°C. and subjected to the tests indicated in Tables I and II below. Specimens were cooled in liquid nitrogen, fractured, and the fractured surfaces were examined by means of a scanning electron microscope. It was found that the presence of the graft copolymer caused the regions of the ethylene polymer to be smaller and more uniform and to have better adhesion to the nylon matrix.

In the Examples and Controls listed in Table I the polyethylene was Alathon 7050, a high density resin and the nylon was either Zytel 101 (66) or Plaskon 8200 (6). The graft copolymers were derived from copolymers of ethylene and maleic anhydride.

The Examples and Controls listed in Table II were all based on Zytel 101 nylon resin. Alathon 3B, Alathon 7050, and the copolymer with 4 percent methacrylic acid are all crystalline polymers of ethylene. In Examples 14 to 16 the graft copolymer was based on a copolymer of ethylene with ethyl hydrogen maleate rather than maleic anhydride. In the graft copolymer of Example 15, the polyamide branches terminate in carboxyl groups. In the other examples, they terminate in n-hexyl groups.

EXAMPLE 17

The following composition was dry blended and processed in a 2.79 cm twin screw extruder at 280°C.:

| | |
|---|---|
| 75 | parts reprocessed nylon (66) fibers |
| 25 | parts Alathon 7050 |
| 2 | parts graft copolymer made from a copolymer of ethylene and 13.3% ethyl hydrogen maleate melt index 102 reacted with 25% of a nylon 6 oligomer of DP 6.55 having n-hexyl end groups |
| 0.112 | part potassium iodide |
| 0.037 | part cuprous iodide |
| 0.037 | part aluminum distearate |

A 0.13 mm jacket of this material was extruded over wire insulated with polyvinyl chloride. The jacket had a tensile strength of 7930 p.s.i. and an elongation at break of 240%. After vacuum drying 16 hours at 80°C., the tensile strength was 8590 p.s.i., and the elongation was 145%. The jacket wire passed a mandrel bend test (UL83) after aging for 24 hours at 95°C. in coil form and after aging for 7 days at 150°C. It also passed cold bend tests (UL83) at −25° and −40°C. as well as the UL83 and FRI vertical flame tests.

EXAMPLE 18

The following composition was dry blended and processed in a 2.79 cm twin screw extruder at about 285°C:

367.5 g Zytel 101
122.5 g Alathon 7050 (average diameter 0.2-0.5u)
9.8 g graft copolymer derived from ethylene/methacrylic acid copolymer containing 8.6% methacrylic acid by an acid chloride method melt index 46 and a nylon (6) oligomer of DP 7.0 having n-hexyl end groups, the graft copolymer containing 36% polyamide. DSC melting points occurred at 104° and 183°C.

The blend was tested for the following properties with the following results:

| | |
|---|---|
| Yield Point | 8060 p.s.i. |
| Ultimate Strength | 7410 p.s.i. |
| Elongation | 230% |
| Izod | 1.28 ft.lb./in. |

TABLE I

| Example | Control 1 | 1 | 2 | Control 2 | 3 | 4 | 5 |
|---|---|---|---|---|---|---|---|
| Nylon | 6 | 6 | 6 | 66 | 66 | 66 | 66 |
| % Polyamide in graft | — | 25 | 40 | — | 46 | 46 | 46 |
| DP of Polyamide in the graft | — | 7 | 15 | — | 7 | 7 | 7 |
| Nylon | 80 | 80 | 80 | 80 | 80 | 80 | 80 |
| Polyethylene | 20 | 20 | 20 | 20 | 20 | 20 | 20 |
| Graft Copolymer | 0 | 5 | 5 | 0 | 1 | 2 | 5 |
| Flexural Modulus, psi | 301,000 | 289,000 | 287,000 | 358,000 | 326,000 | 342,000 | 343,000 |
| Yield Point, psi | 8,570 | 8,110 | 8,130 | 8,190 | 7,940 | 8,160 | 8,050 |
| Ultimate Strength, psi | 9,050 | 9,590 | 9,090 | 6,280 | 6,880 | 6,770 | 6,900 |
| Elongation, % | 220 | 310 | 250 | 58 | 140 | 160 | 170 |
| Izod. ft.lb/in. | 1.1 | 1.1 | 1.4 | .56 | .99 | .87 | .96 |
| Diameter of Polyethylene Particles, μ | .2–1.0 | .2–.6 | .3–.5 | .5–1.1 | .2–.7 | .2–.7 | .3–.9 |

| Example | 6 | 7 | 8 | 9 | 10 | 11 |
|---|---|---|---|---|---|---|
| Nylon | 66 | 66 | 66 | 66 | 66 | 66 |
| % Polyamide in graft | 46 | 46 | 26 | 26 | 19 | 56 |
| DP of Polyamide in the graft | 7 | 7 | 6.5 | 6.5 | 6.5 | 18 |
| Nylon | 70 | 60 | 75 | 75 | 75 | 75 |
| Polyethylene | 30 | 40 | 25 | 25 | 25 | 25 |
| Graft Copolymer | 5 | 5 | 1 | 2 | 2 | 2 |
| Flexural Modulus, psi | 322,000 | 305,000 | 244,000 | 357,000 | 334,000 | 342,000 |
| Yield Point, psi | 7,150 | 6,790 | 7,350 | 7,560 | 7,420 | 7,600 |
| Ultimate Strength, psi | 5,920 | 5,180 | 7,150 | 7,360 | 8,150 | 8,050 |
| Elongation, % | 190 | 60 | 240 | 120 | 250 | 240 |
| Izod. ft.lb/in. | 1.1 | .77 | 1.2 | 1.2 | 1.2 | 1.1 |
| Diameter of Polyethylene Particles, μ | .6–1.0 | .3–1.0 | .2–.7 | .3–1.0 | .2–.8 | .3–.7 |

TABLE II

| Example | Control 3 | 12 | Control 4 | 13 | 14 | 15 | 16 | Control 5 |
|---|---|---|---|---|---|---|---|---|
| Graft Copolymer | | | | | | | | |
| Comonomer | — | MA | — | MA | MAME | MAME | MAME | MAME |
| % Polyamide | — | 19 | — | 19 | 25 | 25 | 25 | 0 |
| DP of Polyamide | — | 6.5 | — | 6.5 | 7.7 | 8 | 7.7 | — |
| Ethylene Polymer | 3B | 3B | E/MAA | E/MAA | 7050 | 7050 | 3B | 7050 |
| Parts Nylon | 80 | 80 | 80 | 80 | 75 | 75 | 75 | 75 |
| Parts Ethylene Polymer | 20 | 20 | 20 | 20 | 25 | 25 | 25 | 25 |
| Parts Graft Copolymer | 0 | 2 | 0 | 2 | 2 | 2 | 2 | 2 |
| Flexural Modulus, pse | 231,000 | 236,000 | 227,000 | 246,000 | 250,000 | 268,000 | 214,000 | 259,000 |
| Yield Point, psi | 6,920 | 7,320 | 7,270 | 7,970 | 7,460 | 7,790 | 6,910 | 7,630 |
| Ultimate Strength, psi | 6,880 | 8,100 | 6,230 | 7,420 | 6,800 | 6,740 | 6,860 | 6,300 |
| Elongation, % | 23 | 240 | 120 | 230 | 100 | 90 | 170 | 50 |
| Izod, ft.lb./in. | 1.2 | 1.5 | 1.5 | 1.6 | 1.7 | 2.2 | 2.7 | 1.7 |
| Diameter of Ethylene Polymer Particles, $\mu$ | 3–10 | .5–1 | 2–4 | ~1 | .2–.4 | .2–.5 | .2–.9 | 1–5 |

MA = maleic anhydride
MAME = ethyl hydrogen maleate
3B = Alathon 3B, low density polyethylene
E/MAA = Copolymer of ethylene and 4% methacrylic acid, melt index 5.8
7050 = Alathon 7050, high density polyethylene

I claim:

1. A polymeric blend comprising 60 to 90 parts by weight of a polyamide selected from the group consisting of polyhexamethylene adipamide, polycaprolactam and copolymers thereof and 40 to 10 parts by weight of polyethylene, characterized in that there is present in the blend 1.8 to 8.0 parts by weight of a plastic graft copolymer consisting essentially of a trunk copolymer derived from 70 to 99 percent by weight ethylene and a comonomer providing amine-reactive sites and polycaprolactam side chains having an average degree of polymerization of about 5 to 30 and having end groups selected from the class consisting of N-alkyl amide where alkyl is in the range of 1 to 20 carbon atoms and carboxylic acid, said side chains being linked to said reactive sites through amide or imide linkages, said graft copolymer having a polyamide content of 15 to 50 percent by weight based on the weight of graft copolymer and having two DTA melting points, one at 80° to 115°C. and the other at at least 165°C.

2. A blend according to claim 1 wherein the comonomer providing amine-reactive sites is selected from the group consisting of an anhydride group, a vicinal pair of carboxylic groups, and a carboxylic group adjacent to an alkoxycarbonyl group wherein the alkoxy group contains up to 20 carbon atoms.

3. A blend according to claim 1 wherein the trunk copolymer has a melt index of 5 to 200.

4. A blend according to claim 3 wherein the caprolactam side chains are present in the amount of 15 to 35 percent by weight based on the weight of graft copolymer.

5. A blend according to claim 1 wherein the non-reactive end groups are N-alkyl amide wherein alkyl is in the range of 4 to 6 carbon atoms.

6. A blend according to claim 1 wherein the comonomer of the trunk copolymer providing the amine-reactive sites is selected from the group consisting of maleic anhydride, half ester of maleic acid and half ester of itaconic acid.

7. A blend according to claim 1 wherein the trunk copolymer is derived from ethylene and maleic anhydride.

8. A blend according to claim 1 wherein the trunk copolymer is derived from ethylene and ethyl hydrogen maleate.

9. A blend according to claim 1 wherein the trunk copolymer and polycaprolactam side chains are linked through imide linkages.

10. A blend according to claim 1 wherein the trunk copolymer and polycaprolactam side chains are linked through amide linkages.

11. A blend according to claim 4 comprising 75 parts by weight of polyamide, 25 parts by weight polyethylene and 2 parts by weight of graft copolymer in which the polycaprolactam branches have a degree of polymerization of about 7.

12. A blend according to claim 1 wherein flexural modulus of the graft copolymer at room temperature is at least 28,000 p.s.i.

13. A blend according to claim 1 wherein the polyamide is polyhexamethylene adipamide.

14. A blend according to claim 1 wherein the polyamide is polycaprolactam.

15. A polymeric blend comprising 60 to 90 parts by weight of a polyamide selected from the group consisting of polyhexamethylene adipamide, polycaprolactam and copolymers thereof and 40 to 10 parts by weight of polyethylene, characterized in that there is present in the blend 1.8 to 8.0 parts by weight of a plastic graft copolymer consisting essentially of a trunk copolymer derived from 70 to 99 percent by weight ethylene and a comonomer providing amine-reactive sites and polycaprolactam side chains having an average degree of polymerization of about 6 to 8 and having end groups selected from the class consisting of N-alkyl amide where alkyl is in the range of 1 to 20 carbon atoms and carboxylic acid, said side chains being linked to said reactive sites through amide or imide linkages, said graft copolymer having a polyamide content of 15 to 50 percent by weight based on the weight of graft copolymer and having two DTA melting points, one at 80° to 115°C. and the other at at least 165°C.

* * * * *